United States Patent
Zhu

(10) Patent No.: US 11,971,770 B2
(45) Date of Patent: Apr. 30, 2024

(54) CURRENT CALIBRATION DEVICE AND CUREENT CALIBRATION METHOD FOR POWER SUPPLY CHANNEL IN TEST SYSTEM THEREOF

(71) Applicant: SHANGHAI NCATEST TECHNOLOGIES CO., LTD., Shanghai (CN)

(72) Inventor: Edward Zhu, Shanghai (CN)

( * ) Notice: Subject to any disclaimer, the term of this patent is extended or adjusted under 35 U.S.C. 154(b) by 34 days.

(21) Appl. No.: 17/426,161

(22) PCT Filed: Oct. 14, 2020

(86) PCT No.: PCT/CN2020/120840
§ 371 (c)(1),
(2) Date: Jul. 28, 2021

(87) PCT Pub. No.: WO2021/184740
PCT Pub. Date: Sep. 23, 2021

(65) Prior Publication Data
US 2022/0413588 A1 Dec. 29, 2022

(30) Foreign Application Priority Data

Mar. 19, 2020 (CN) .......................... 202010196868.9

(51) Int. Cl.
*G06F 1/30* (2006.01)
*G06F 1/3234* (2019.01)
(Continued)

(52) U.S. Cl.
CPC .......... *G06F 1/3253* (2013.01); *G06F 1/3296* (2013.01); *G06F 13/4282* (2013.01)

(58) Field of Classification Search
CPC ... G06F 1/3253; G06F 1/3296; G06F 13/4282
(Continued)

(56) References Cited

U.S. PATENT DOCUMENTS

2019/0377016 A1* 12/2019 Nakamura ............. G01R 31/40
2021/0231728 A1* 7/2021 Yawata ............. G01R 31/2839

FOREIGN PATENT DOCUMENTS

CN 1900733 A * 1/2007
CN 103513206 A * 1/2014

* cited by examiner

*Primary Examiner* — Chun Cao
(74) *Attorney, Agent, or Firm* — TIANCHEN LLC.; Yuan R. Li; Yi Fan Yin

(57) ABSTRACT

The present invention disclosures a current calibration device for power supply channels in a test system, comprising n power supply channels, n connection switches corresponding to the n power supply channels, m resistors, m selection switches corresponding to the m resistors, a VBIAS power supply, a SPI bus, a host computer and an ammeter, wherein, both n and m are integers greater than 0; one end of each of the n power supply channels is connected to the SPI bus, and another end of each of the n power supply channels is connected to a node Q through a connection switch correspondingly, both ends of the selection switch are connected respectively to the node Q and one end of the resistor, and another end of the resistor is connected to the positive terminal of the ammeter, and the negative terminal of the ammeter is connected to the VBIAS power supply, and the VBIAS power supply is connected to the SPI bus simultaneously. The present invention provides a current calibration device and a current calibration method for power supply channels in a test system, which realizes segmented calibration through a software algorithm and improves measurement accuracy of the power supply channels; and solves a problem that a traditional current calibration for power supply channels can only cover a single point or a few voltage ranges.

10 Claims, 3 Drawing Sheets

(51) Int. Cl.
*G06F 1/3296* (2019.01)
*G06F 13/42* (2006.01)
(58) Field of Classification Search
USPC .......................................................... 713/300
See application file for complete search history.

===Prior Art===

==Prior Art==

CURRENT CALIBRATION DEVICE AND CUREENT CALIBRATION METHOD FOR POWER SUPPLY CHANNEL IN TEST SYSTEM THEREOF

CROSS-REFERENCE TO RELATED APPLICATION

This application claims priority of International Patent Application Serial No. PCT/CN2020/120840, filed Oct. 14, 2020, which is related to and claims priority of Chinese patent application Serial No. 202010196868.9 filed on Mar. 19, 2020. The entirety of each of the above-mentioned patent applications is hereby incorporated herein by reference and made a part of this specification.

TECHNICAL FIELD

The disclosure relates to the field of current calibration for a test system, in particular to a current calibration device and a current calibration method for a power supply channel formed by the current calibration device in the test system.

BACKGROUND

Large amounts of device power supply (DPS, or power supply channel) can be used in Automatic Test Equipment (ATE) to supply power to a chip under test (DUT) and measure a current accurately, an application topology is shown in FIG. 1. Different types of the DUT require different combinations of voltage and the current. Before a chip leaves a factory, a manufacturer usually needs to measure a static current, a dynamic current, a leakage current and other parameters of the DUT under different modes accurately, so as to determine whether the chip meets design requirements.

In order to ensure accuracy of a current measurement, each of the DPSs which from DPS_1 to DPS_n on a DPS board needs to be calibrated regularly. A traditional calibration topology is shown in FIG. 2, which comprises n DPSs (from DPS_1 to DPS_n) on the DPS board, n corresponding switches (from k1 to kn), a resistor R1 on a calibration PB and a connection resistor R1 Ammeter. A traditional calibration method is controlled by an external current-limiting resistor R1, R1 is a fixed value, once a current is fixed, output voltage U1 cannot be flexibly configured, which belongs to a voltage/current single-point calibration method, that is, the current can only be calibrated under specific voltage. For an example, an output current I1 of the DPS calibrated, U1=I1*R1, U1 is a fixed value, measurement accuracy of the current I1 cannot be calibrated under other specifications of voltage Un. A traditional current calibration scheme has a problem of incomplete coverage of voltage specifications. Practical applications have found that a system leakage current is different under different voltages, device offset caused by heating is different, and a measurement data after a single-point calibration has a certain inherent deviation.

With reference to FIG. 2 and FIG. 3, an example of a calibration method in the prior art is as follows: compared with the traditional calibration scheme in FIG. 2, I1=1A corresponds to a current measurement calibration performed at U1=2.5V, and other voltage ranges share this calibration, it can be seen from FIG. 3 that relative error of current measurement of 2.5V as an error calibration point is +0.0109A, and a software defaults that the relative error of current measurement of 1A under other voltages such as 0-5V is also 0.0109A, which is not the same in an actual measurement. A maximum absolute error Δ ΔIC=0.0039A introduced by the traditional calibration scheme due to the calibration method (absolute error when outputting 0V/1A=0.109A-0.007A). Therefore, the current calibration device of the DPS in ATE in the prior art cannot calibrate the current of the DPS accurately.

SUMMARY

The purpose of the present invention is to provide a current calibration device and a current calibration method for power supply channels in a test system, which realizes segmented calibration through a software algorithm and improves measurement accuracy of the power supply channels; and solves a problem that a traditional current calibration for power supply channels can only cover a single point or a few voltage ranges.

In order to achieve above objectives, the present invention adopts following technical solution: a current calibration device for power supply channels in a test system, comprising n power supply channels, n connection switches corresponding to the n power supply channels, m resistors, m selection switches corresponding to the m resistors, a VBIAS power supply, a SPI bus, a host computer and an ammeter, wherein, n and m are integers greater than 0;

one end of each of the n power supply channels is connected to the SPI bus, and another end of each of the n power supply channels is connected to a node Q through a connection switch correspondingly, two ends of the selection switch are connected respectively to the node Q and one end of the resistor, and another end of the resistor is connected to the positive terminal of the ammeter, and the negative terminal of the ammeter is connected to the VBIAS power supply, and the VBIAS power supply is connected to the SPI bus simultaneously;

the host computer controls one of the connection switches and one of the selection switches to open and close, and the SPI bus controls output voltages of both the n power supply channels and the VBIAS power supply Further, the resistance values of the m resistors are different.

Further, all of the m resistors are high-power low-temperature drift current-limiting resistors.

Further, the VBIAS power supply is a programmable voltage source, which supports positive and negative dual power rail output.

A current calibration method for power supply channels formed by the current calibration device in a test system, comprising following steps:

S01: the host computer selects one of connection switches and one of selection switches to close to form a power supply channel of the n power supply channels;

S02: the SPI bus adjusts an output voltage (Va) of the power supply channel and an output voltage (Vb) of the VBIAS power supply, and records a value of an output current (Ia) of the power supply channel and a value of a measured current (Ib) of a ammeter;

S03: drawing a curve of output voltages (Va) and measurement errors (A) of the n power supply channels according to the values in S02; the measurement errors (A) are absolute differences between values of output currents (Ia) of the n power supply channels and values of measured currents (Ib) of the ammeter;

S04: dividing the curve into p intervals within an output voltage range of the power supply channel and calculating an absolute error of each of the p intervals respectively; p is an integer greater than 0;

S05: a current value of the power supply channel in the n power supply channels under the output voltage is equal to sum of the value of the measured current of the ammeter and the absolute error of an interval corresponding to a specific output voltage.

Further, in step S02, specifically comprising:

S021: the SPI bus adjusts the output voltage (Vb) of the VBIAS power supply and an output voltage (Va) of a corresponding power supply channel of the n power supply channels, to Va−Vb=x; and records a value of a output current (Ia) of the corresponding power supply channel and a value of a measured current (Ib) of the ammeter; Wherein, x is greater than 0, and the value of the output current (Ia) is a current value to be calibrated;

S022: repeating step S021 Y times to obtain Y values of Y output currents (Ia) of Y power supply channels and Y values of Y measured currents (Ib) of the ammeter; Y is an integer greater than 0.

Further, in step S03, drawing the curve of the output voltages (Va) of the Y power supply channels and the measurement errors (A) according to both of the Y values in S022.

Further, in step S021, repeating step S021 Y times, the SPI bus sets the output voltage (Va) of the corresponding power supply channel in the Y power supply channels to increase uniformly or decrease uniformly.

Further, in step S01, specifically comprising: determining a pending power supply channel to be calibrated and a pending current value (Ia) to be calibrated of the pending power supply channel; the host computer controls a corresponding connection switch corresponding to the pending power supply channel to open and close; the host computer selects one of the selection switches to open and close according to the pending current value (Ia) to be calibrated.

Further, in step S01, the larger the pending current value (Ia) to be calibrated, the smaller resistance value of the one of the selection switches opened and closed by the host computer.

Beneficial effects of the present invention are: the present invention has simple structure, low hardware cost, adds a VBIAS power supply to a calibration loop, and realizes an automatic calibration through a high-precision ammeter in cooperation with a host computer. In the present invention, a calibration error curve of a current under full-scale voltage outputted by a power supply channel can be obtained through the VBIAS power supply. The present invention can realize segmented current calibration and improve accuracy of current measurement.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
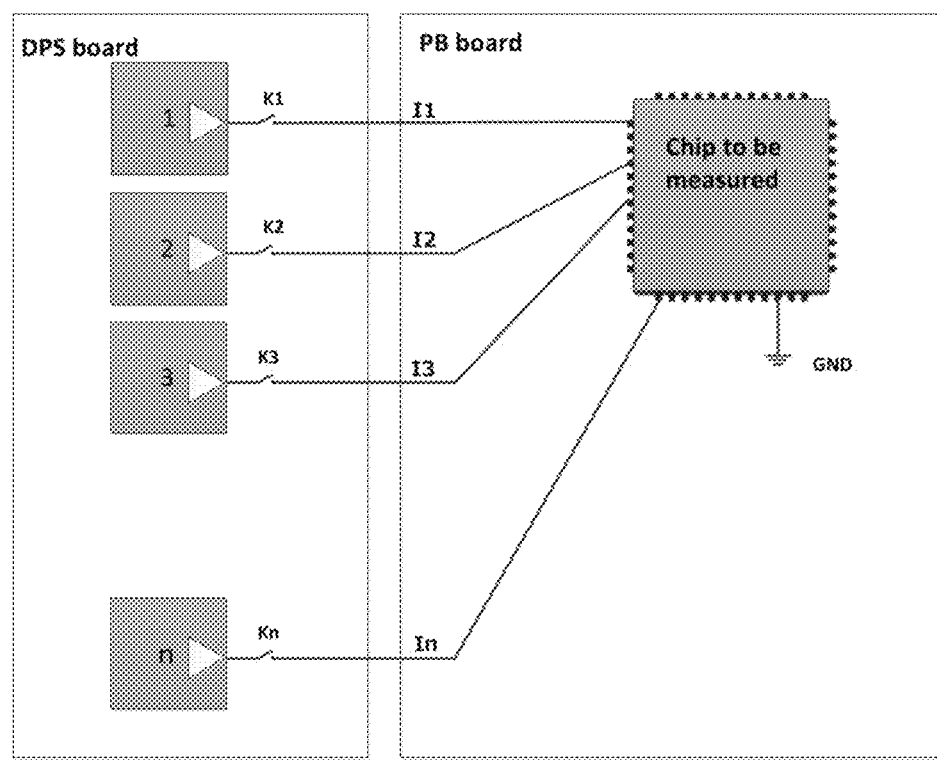
FIG. 1 is an application topology of DSP in the prior art.
Figure 2:
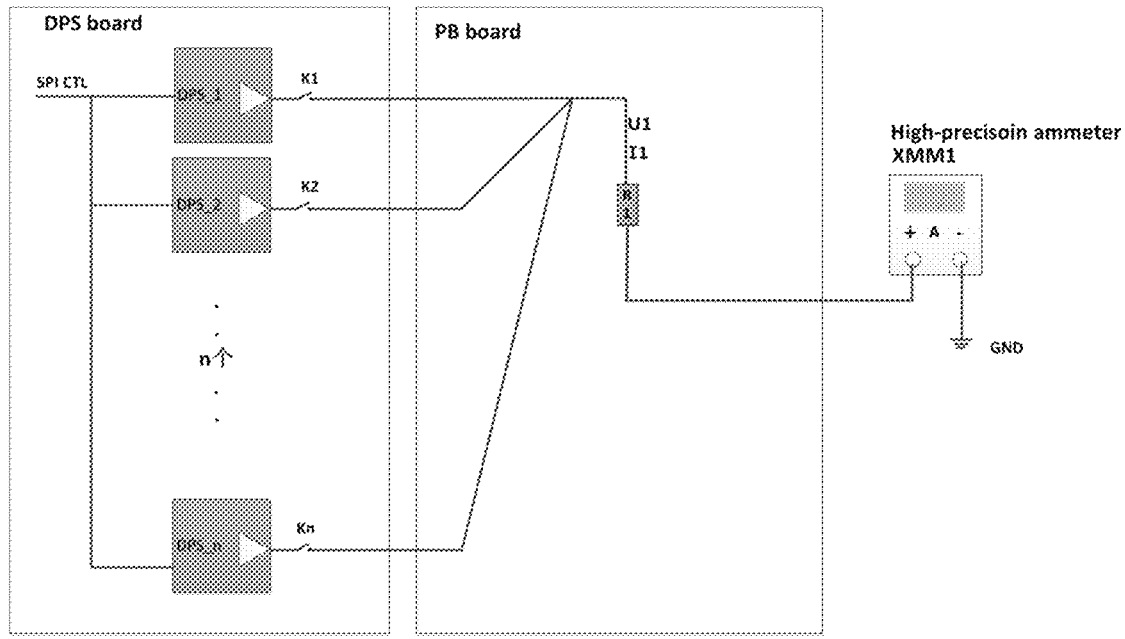
FIG. 2 is a calibration topology of DSP in the prior art.
Figure 3:
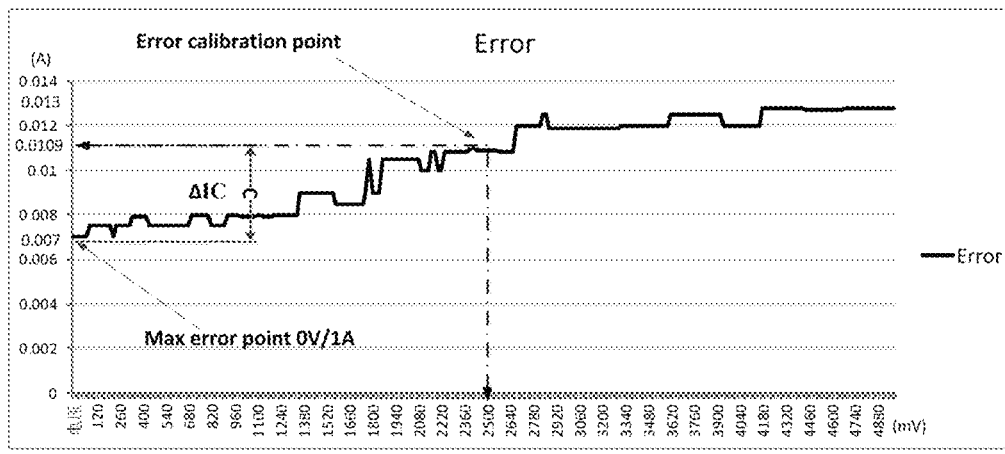
FIG. 3 is a current calibration error curve in the prior art.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the present invention, a current calibration device for power supply channels in a test system comprises n power supply channels (from DPS_1 to DPS_n) on a DPS board, n connection switches (from k1 to kn) corresponding to the n power supply channels, m resistors located on a calibration PB, m selection switches corresponding to the m resistors, a VBIAS power supply, a SPI bus, a host computer and an ammeter.

One end of each of the n power supply channels is connected to the SPI bus, and another end of each of the n power supply channels is connected to a node Q through a connection switch correspondingly, both ends of the selection switch are connected respectively to the node Q and one end of the resistor, and another end of the resistor is connected to the positive terminal of the ammeter, and the negative terminal of the ammeter is connected to the VBIAS power supply, and the VBIAS power supply is connected to the SPI bus simultaneously; the host computer controls one of the connection switches and one of the selection switches to open and close, and the SPI bus controls output voltages of both the n power supply channels and the VBIAS power supply.

Specifically, in the present invention, the resistance values of the m resistors are different, and all of the m resistors are high-power low-temperature drift current-limiting resistors, different resistors are used for different current calibration gears, and resistors with higher resistance values in the m resistors are used to calibrate range calibrations for small currents.

Specifically, the VBIAS power supply is a programmable voltage source, Which is implemented by using integrated amplifiers, integrated chips or discrete solutions, and supports positive and negative dual power rail output, voltage amplitude of the output voltage (Vb) of the VBIAS power supply is adjusted through the SPI bus.

In the present invention, values of the output currents of the n power supply channels are expressed as Ia, which are currents to be calibrated and obtained through the SPI bus; the value of the measured current of the ammeter is expressed as Ib, which is a reference current and obtained automatically through the host computer. Values of output voltages of the n power supply channels are expressed as Va, and measurement points are corresponding to the input terminals of the m resistors. The output voltages of the n power supply channels and an output range of the output voltages of the n power supply channels are controlled by the SPI bus; a value of a output voltage of the VBIAS power supply is expressed as Vb, and the output voltage of the VBIAS power supply and an output range of the output voltage of the VBIAS power supply are controlled by the SPI bus.

Though connecting the VBIAS power supply with the calibration PB, the output voltages of the n power supply channels can be changed arbitrarily within a full scale, and a current flowing through the m resistors keeps unchanged relatively. Measurement errors of the current under different output voltages of different the n power supply channels can be obtained through a software algorithm, thus finally accurate calibration datum can be obtained.

A current calibration method for power supply channels in a test system comprises following steps:

S01: the host computer selects one of connection switches and one of selection switches to close to form a power supply channel of the n power supply channels;

Specifically, determining a pending power supply channel to be calibrated and a pending current value (Ia) to be calibrated of the pending power supply channel; the host computer controls a corresponding connection switch corresponding to the pending power supply channel to open and close; the host computer selects one of the selection switches to open and close according to the pending current value (Ia) to be calibrated. The host computer selects one of the selection switches according to following rules: the larger the pending current value (Ia) to be calibrated, the smaller resistance value of the one of the selection switches opened and closed by the host computer.

S02: the SPI bus adjusts an output voltage (Vb) of the VBIAS power supply and an output voltage (Va) of the power supply channel which is corresponding to the connection switch and records a value of an output current (Ia) of the power supply channel and a values of a measured current (Ib) of the ammeter;

S021: the SPI bus adjusts the output voltage (Vb) of the VBIAS power supply and an output voltage (Va) of a corresponding power supply channel of the n power supply channels to Va−Vb=x; and records a value of a output current (Ia) of the corresponding power supply channel and a value of a measured current (Ib) of the ammeter; Wherein, x is greater than 0, and the value of the output current (Ia) is a current value to be calibrated; wherein, x is greater than 0, Ia is the pending current value to be calibrated, and x=Ia×R, R is a resistance value of a resistance connected with the selection switch which is opened and closed;

S022: repeating step S021 Y times to obtain Y values of Y output currents (Ia) of Y power supply channels and Y values of Y measured currents (Ib) of the ammeter; wherein, in step S021, repeating step S021 Y times, the SPI bus sets the output voltage (Va) of the corresponding power supply channel in the Y power supply channels to increase uniformly or decrease uniformly.

S03: drawing a curve of the output voltages (Va) and measurement errors (A) of the n power supply channels according to the values in S02; the measurement errors (A) are absolute differences between values of output currents (Ia) of the n power supply channels and values of measured currents (Ib) of the ammeter.

S04: dividing the curve into p intervals within an output voltage range of the power supply channel and calculating an absolute error of each of the p intervals respectively; p is an integer greater than 0;

S05: a current value of a specific power supply channel of the n power supply channels under a specific output voltage is equal to sum of a value of a measured current of the ammeter and an absolute error of an interval corresponding to the specific output voltage.

The present invention can cover current calibration linearly under all of voltage ranges; realize a realize segment calibration through a software algorithm; improve current measurement accuracy of power supply channels in a test system; solve a problem that traditional current calibration can only cover a single point or a few voltage ranges.

Following further explains the present invention through an embodiment 1:

EMBODIMENT 1

Figure 4:
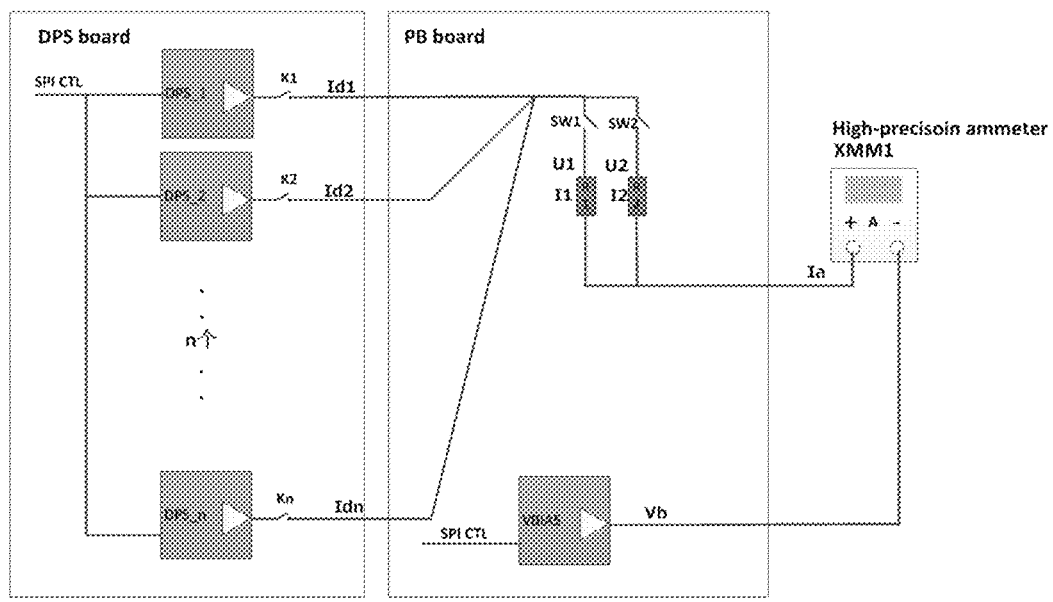
FIG. 4 is a calibration topology of DSP in embodiment 1.
Figure 5:
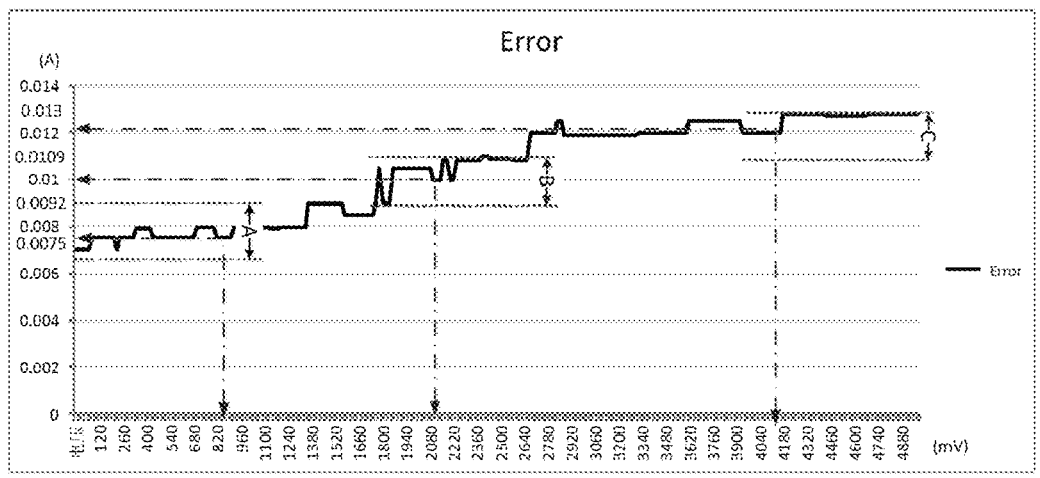
FIG. 5 is a current calibration error curve in embodiment 1.

As shown in FIG. 4, a current calibration device for power supply channels in a test system in the embodiment 1 comprises n power supply channels (from DPS_1 to DPS_n) on a DPS board, n connection switches (from k1 to kn) corresponding to the n power supply channels, 2 resistors (R1 and R2) located on a calibration PB, 2 selection switches (SW1 and SW2) corresponding to the 2 resistors, a VBIAS power supply and an high-precision ammeter, a SPI bus, a host computer. SPI_CTL in FIG. 4 represents the SPI bus.

One end of each of the n power supply channels is connected to the SPI bus, and another end of each of the n power supply channels is connected to a node Q through a connection switch correspondingly, both ends of the selection switch are connected respectively to the node Q and one end of the resistor, and another end of the resistor is connected to the positive terminal of the ammeter, and the negative terminal of the ammeter is connected to the VBIAS power supply, and the VBIAS power supply is connected to the SPI bus simultaneously; the host computer controls one of the connection switches and one of the selection switches to open and close, and the SPI bus controls output voltages of both the n power supply channels and the VBIAS power supply.

Specifically, a resistance value of the resistor R1 is 1 ohm, and a resistance value of the resistor R2 is 10 ohm, both of R1 and R2 are high-power low-temperature drift current-limiting resistors. The resistance value of the resistor R1 and the resistance value of the resistor R2 are used for two different current calibration gears, and R1 is used for range calibration for a large current with value in [500~1200 mA] and [−500~−1200 mA], R2 is used for range calibration for a current with value in [−500~500 mA].

In this embodiment, due to the selection switches SW1 and SW2, only one of the connection switches (k1~kn) can be opened and closed at a time, in a series circuit, Ia=I1=Ib or Ia=I2=Ib. The selection switch SW1 is opened and closed for the range calibration for a large current with value in [500~1200 mA] and [−500~−1200 mA], and the selection switch SW2 is opened and closed for the range calibration for a current with value in [−500~500 mA].

Assuming that a specification of the output voltage of the n power supply channels in this embodiment is from 0V to 5V, and specifications of the output current and the current measurement are from 0A to ±1.2A. Following takes a calibration of +1A current of the power supply channel DPS_1 as an example for analysis; it is worth noting that when others (DPS_2 to DPS_n) of the n power supply channels is analyzed, corresponding connection switch needs to be turned on and off, other steps are the same as following steps; meanwhile, when calibrating one of other current values, a corresponding resistance is selected according to the one of other current values, and other steps are the same as the following steps.

The current calibration method for power supply channels in a test system, comprising following steps:

S01: determining a pending power supply channel (DPS_1) to be calibrated and a pending current value (+1A) to be calibrated of the pending power supply channel; the host computer controls a connection switch (k1 corresponding to the DPS_1) to open and close; the host computer controls a selection switch (SW1 correspondingly) according to the pending connection switch.

S02: a SPI bus adjusts an output voltage (Vb) of a VBIAS power supply and an output voltage (Va) of a power supply channel (DPS_1), and records values of output currents of the power supply channel (DPS_1) and values of measured currents of a ammeter. Specifically:

S021: the SPI bus adjusts a output voltage (Vb1) of the VBIAS power supply to −1V and a output voltage (Va1) of the pending power supply channel (DPS_1) correspondingly to 0V, and records the value of the output current (Ia1) of the pending power supply channel (DPS_1) and the value of the measured current (Ib1) of the ammeter;

S022: the SPI bus adjusts an output range of the output voltage (Va) of the pending power supply channel (DPS_1) according to a certain step, such as 20 mV, for increments or decrements, meanwhile, the SPI bus adjusts to the output voltage (Vb) of the VBIAS power supply to ensure Va−Vb=1V; each of voltage levels repeats step S021 and a total of 251 sets of test data are obtained.

S03: drawing a curve of the output voltages (Va) and measurement errors (A) for the n power supply channels according to the values in S02; the measurement errors (A) are an absolute differences between the values of the output currents (Ia) of the n power supply channels, and the values of the measured currents (Ib) of the ammeter.

S04: dividing the curve into 3 intervals within an output voltage range (0~5V) of the n power supply channels, the 3 intervals are A (0~1.7V), B(1.7~2.7V), C(2.7~5.0V), and absolute errors introduced respectively corresponding to the 3 intervals are ΔIA=0.0017A, ΔIB=0.008A, and ΔIC=0.0011A. Compared with an absolute error ΔIC=0.0039A introduced by a traditional calibration method, a current measurement accuracy under the test 1A range is improved by 0.22%, and the current calibration method reaches design expectations of improving the measurement accuracy.

S05: the output voltage (Va) of the pending power supply channel is 5V, the value of the output current (Ia) of the pending power supply channel (DPS_1) is 1A, and a current calibrated is Ia'=Ia+ΔIC=1.0011A.

The present invention has simple structure, low hardware cost, adds a VBIAS power supply to a calibration loop, and realizes an automatic calibration through a high-precision ammeter in cooperation with a host computer. In the present invention, a calibration error curve of a current under full-scale voltage outputted by a power supply channel can be obtained through the VBIAS power supply. The present invention can realize segmented current calibration and improve accuracy of current measurement.

The above descriptions are only the preferred embodiments of the present invention, and the described embodiments are not used to limit the scope of patent protection of the present invention. Therefore, any equivalent structural changes made using the contents of the description and drawings of the present invention should be included in the same reasoning. Within the protection scope of the appended claims of the present invention.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A current calibration device for power supply channels in a test system, comprising n power supply channels, n connection switches corresponding to the n power supply channels, m resistors, m selection switches corresponding to the m resistors, a VBIAS power supply, a SPI bus, a host computer and an ammeter, wherein, n and m are integers greater than 0;

one end of each of the n power supply channels is connected to the SPI bus, and another end of each of the n power supply channels is connected to a node Q through a connection switch correspondingly, two ends of the selection switch are connected respectively to the node Q and one end of the resistor, and another end of the resistor is connected to the positive terminal of the ammeter, and the negative terminal of the ammeter is connected to the VBIAS power supply, and the VBIAS power supply is connected to the SPI bus simultaneously;

the host computer controls one of the connection switches and one of the selection switches to open and close, and the SPI bus controls output voltages of the n power supply channels and the VBIAS power supply.

2. The current calibration device of claim 1, wherein the resistance values of the m resistors are different.

3. The current calibration device of claim 2, wherein all of the m resistors are high-power low-temperature drift current-limiting resistors.

4. The current calibration device of claim 1, wherein the VBIAS power supply is a programmable voltage source, which supports positive and negative dual power rail output.

5. A current calibration method for power supply channels formed by the current calibration device of claim 1 in a test system, comprising following steps:

S01: the host computer selects one of connection switches and one of selection switches to close to form a power supply channel of the n power supply channels;

S02: the SPI bus adjusts an output voltage (Va) of the power supply channel and an output voltage (Vb) of the VBIAS power supply, and records a value of an output current (Ia) of the power supply channel and a value of a measured current (Ib) of a ammeter;

S03: drawing a curve of output voltages (Va) and measurement errors (A) of the n power supply channels according to the values in S02; the measurement errors (A) are absolute differences between values of output currents (Ia) of the n power supply channels and values of measured currents (Ib) of the ammeter;

S04: dividing the curve into p intervals within an output voltage range of the power supply channel and calculating an absolute error of each of the p intervals respectively; p is an integer greater than 0;

S05: a current value of the power supply channel of the n power supply channels under the output voltage is equal to sum of the value of the measured current of the ammeter and the absolute error of an interval corresponding to a specific output voltage.

6. The current calibration method of claim 5, wherein in step S02, specifically comprising:

S021: the SPI bus adjusts the output voltage (Vb) of the VBIAS power supply and an output voltage (Va) of a corresponding power supply channel of the n power supply channels, to Va−Vb=x; and records a value of a output current (Ia) of the corresponding power supply channel and a value of a measured current (Ib) of the ammeter; Wherein, x is greater than 0, and the value of the output current (Ia) is a current value to be calibrated;

S022: repeating step S021 Y times to obtain Y values of Y output currents (Ia) of Y power supply channels and Y values of Y measured currents (Ib) of the ammeter;
Y is an integer greater than 0.

7. The current calibration method of claim 6, wherein in step S03, drawing the curve of the output voltages (Va) of the Y power supply channels and the measurement errors (A) according to both of the Y values in S022.

8. The current calibration method of claim 6, wherein in step S021, repeating step S021 Y times, the SPI bus sets the output voltage (Va) of the corresponding power supply channel in the Y power supply channels to increase uniformly or decrease uniformly.

9. The current calibration method of claim 5, wherein in step S01, specifically comprising: determining a pending power supply channel to be calibrated and a pending current value (Ia) to be calibrated of the pending power supply channel; the host computer controls a corresponding connection switch corresponding to the pending power supply channel to open and close; the host computer selects one of the selection switches to open and close according to the pending current value (Ia) to be calibrated.

10. The current calibration method of claim 9, wherein in step S01, the larger the pending current value (Ia) to be calibrated, the smaller resistance value of the one of the selection switches opened and closed by the host computer.

\* \* \* \* \*